US009565612B2

(12) United States Patent
Nanda et al.

(10) Patent No.: US 9,565,612 B2
(45) Date of Patent: Feb. 7, 2017

(54) METHOD AND APPARATUS FOR INTERFERENCE MANAGEMENT

(71) Applicant: QUALCOMM Incorporated, San Diego, CA (US)

(72) Inventors: Sanjiv Nanda, Ramona, CA (US); Ramin Rezaiifar, Del Mar, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 14/559,683

(22) Filed: Dec. 3, 2014

(65) Prior Publication Data

US 2015/0146693 A1 May 28, 2015

Related U.S. Application Data

(62) Division of application No. 12/191,250, filed on Aug. 13, 2008, now Pat. No. 8,923,212.
(Continued)

(51) Int. Cl.
*H04W 36/06* (2009.01)
*H04W 48/02* (2009.01)
(Continued)

(52) U.S. Cl.
CPC ............ *H04W 36/30* (2013.01); *H04W 16/02* (2013.01); *H04W 36/04* (2013.01); *H04W 36/06* (2013.01);
(Continued)

(58) Field of Classification Search
CPC ...... H04W 36/04; H04W 36/06; H04W 36/08; H04W 48/02–48/20
See application file for complete search history.

(56) References Cited

U.S. PATENT DOCUMENTS

| 5,729,826 A | 3/1998 | Gavrilovich |
| 6,028,851 A | 2/2000 | Persson et al. |

(Continued)

FOREIGN PATENT DOCUMENTS

| CN | 1213942 A | 4/1999 |
| CN | 1286841 A | 3/2001 |

(Continued)

OTHER PUBLICATIONS

European Search Report—EP11175371—Search Authority—Munich—Sep. 1, 2011.
(Continued)

*Primary Examiner* — Hoon J Chung
(74) *Attorney, Agent, or Firm* — Jia J. Wu

(57) ABSTRACT

In some aspects, restricted access nodes are assigned to a designated common channel while access terminals that are in active communication with a macro access node may selectively be assigned to the designated channel. In some aspects, an access terminal associated with macro access node may perform a handoff to a different carrier when the access terminal is in the vicinity of a coverage area of a restricted access node. In some aspects, an access terminal associated with a macro access node may perform a handoff to a different carrier based on location information. In some aspects, access to a restricted access node is controlled based on policy and/or based on operation of an access terminal associated with the restricted access node.

11 Claims, 12 Drawing Sheets

Related U.S. Application Data

(60) Provisional application No. 60/965,164, filed on Aug. 17, 2007.

(51) Int. Cl.

| | |
|---|---|
| *H04W 36/04* | (2009.01) |
| *H04W 36/30* | (2009.01) |
| *H04W 16/02* | (2009.01) |
| *H04W 36/08* | (2009.01) |
| *H04W 12/08* | (2009.01) |
| *H04W 48/04* | (2009.01) |
| *H04W 64/00* | (2009.01) |
| *H04W 72/04* | (2009.01) |
| *H04W 84/04* | (2009.01) |
| *H04W 84/18* | (2009.01) |

(52) U.S. Cl.
CPC ............. *H04W 48/02* (2013.01); *H04W 12/08* (2013.01); *H04W 36/08* (2013.01); *H04W 48/04* (2013.01); *H04W 64/00* (2013.01); *H04W 72/0453* (2013.01); *H04W 84/045* (2013.01); *H04W 84/18* (2013.01); *Y02P 60/216* (2015.11)

(56) References Cited

U.S. PATENT DOCUMENTS

| | | | |
|---|---|---|---|
| 6,101,389 A | 8/2000 | Koizumi et al. | |
| 6,301,478 B1 | 10/2001 | Wallstedt et al. | |
| 6,351,651 B1* | 2/2002 | Hamabe | H04W 52/343 455/522 |
| 6,393,003 B1 | 5/2002 | Lee | |
| 6,430,168 B1* | 8/2002 | Djurkovic | H04W 36/04 370/331 |
| 6,480,716 B2 | 11/2002 | Salonaho | |
| 6,597,679 B1 | 7/2003 | Willars | |
| 6,970,719 B1 | 11/2005 | McConnell et al. | |
| 7,027,816 B2 | 4/2006 | Kikuma et al. | |
| 7,145,890 B1 | 12/2006 | Seo et al. | |
| 7,251,491 B2 | 7/2007 | Jha | |
| 8,700,083 B2 | 4/2014 | Yavuz et al. | |
| 8,712,461 B2 | 4/2014 | Yavuz et al. | |
| 2003/0064727 A1 | 4/2003 | Tsai et al. | |
| 2003/0095512 A1 | 5/2003 | Hepsaydir | |
| 2003/0095513 A1 | 5/2003 | Woodmansee et al. | |
| 2003/0109257 A1* | 6/2003 | Nilsson | H04W 16/00 455/436 |
| 2003/0198285 A1 | 10/2003 | Qi et al. | |
| 2004/0106412 A1* | 6/2004 | Laroia | H04W 16/12 455/448 |
| 2004/0156372 A1 | 8/2004 | Hussa | |
| 2004/0192375 A1 | 9/2004 | Cho et al. | |
| 2004/0235479 A1 | 11/2004 | Cho et al. | |
| 2004/0252666 A1 | 12/2004 | Johnson | |
| 2005/0070283 A1 | 3/2005 | Hashimoto et al. | |
| 2005/0090224 A1 | 4/2005 | Dorsey et al. | |
| 2005/0114650 A1 | 5/2005 | Rockwood et al. | |
| 2005/0136925 A1 | 6/2005 | Yamauchi | |
| 2005/0141471 A1 | 6/2005 | Virtanen et al. | |
| 2005/0250496 A1 | 11/2005 | Hason et al. | |
| 2006/0084390 A1 | 4/2006 | Salonaho et al. | |
| 2006/0128392 A1 | 6/2006 | Turina et al. | |
| 2006/0291383 A1 | 12/2006 | Bi et al. | |
| 2007/0011725 A1 | 1/2007 | Sahay et al. | |
| 2007/0046527 A1 | 3/2007 | Sundaralingam et al. | |
| 2007/0072563 A1 | 3/2007 | Weaver | |
| 2007/0097938 A1 | 5/2007 | Nylander et al. | |
| 2007/0105568 A1 | 5/2007 | Nylander et al. | |
| 2007/0105598 A1 | 5/2007 | Varming | |
| 2007/0123260 A1 | 5/2007 | Kim et al. | |
| 2007/0140185 A1 | 6/2007 | Garg et al. | |
| 2007/0149226 A1 | 6/2007 | De Vries | |
| 2007/0183427 A1 | 8/2007 | Nylander et al. | |
| 2007/0248060 A1 | 10/2007 | Mooney et al. | |
| 2007/0270152 A1 | 11/2007 | Nylander et al. | |
| 2008/0310404 A1 | 12/2008 | Valme et al. | |
| 2009/0007218 A1 | 1/2009 | Hubbard | |
| 2009/0034443 A1 | 2/2009 | Walker et al. | |
| 2009/0042593 A1 | 2/2009 | Yavuz et al. | |
| 2009/0042596 A1 | 2/2009 | Yavuz et al. | |
| 2009/0046632 A1 | 2/2009 | Nanda et al. | |
| 2009/0047931 A1 | 2/2009 | Nanda et al. | |
| 2009/0052395 A1 | 2/2009 | Bao et al. | |
| 2009/0061873 A1 | 3/2009 | Bao et al. | |
| 2009/0080386 A1 | 3/2009 | Yavuz et al. | |
| 2009/0080499 A1 | 3/2009 | Yavuz et al. | |
| 2009/0081970 A1 | 3/2009 | Yavuz et al. | |
| 2009/0082026 A1 | 3/2009 | Yavuz et al. | |
| 2009/0082027 A1 | 3/2009 | Yavuz et al. | |
| 2009/0086861 A1 | 4/2009 | Yavuz et al. | |
| 2009/0097448 A1 | 4/2009 | Vasudevan et al. | |
| 2009/0129336 A1 | 5/2009 | Osborn | |
| 2009/0135796 A1 | 5/2009 | Nanda et al. | |
| 2009/0186627 A1 | 7/2009 | Zhang | |
| 2010/0120437 A1 | 5/2010 | Foster et al. | |
| 2011/0281571 A1 | 11/2011 | Patel et al. | |
| 2012/0039326 A1 | 2/2012 | Chia et al. | |

FOREIGN PATENT DOCUMENTS

| | | |
|---|---|---|
| CN | 1359207 A | 7/2002 |
| CN | 1359207 A | 7/2002 |
| CN | 1533213 A | 9/2004 |
| CN | 1716898 A | 1/2006 |
| EP | 1463364 A2 | 9/2004 |
| JP | 9009354 A | 1/1997 |
| JP | 2000514267 A | 10/2000 |
| JP | 2001313698 A | 11/2001 |
| JP | 2002543724 A | 12/2002 |
| JP | 2003101545 A | 4/2003 |
| JP | 2004072631 A | 3/2004 |
| JP | 2004289723 A | 10/2004 |
| JP | 2005020310 A | 1/2005 |
| JP | 2005109570 A | 4/2005 |
| JP | 2005509327 A | 4/2005 |
| JP | 2007129405 A | 5/2007 |
| KR | 20040083851 A | 10/2004 |
| KR | 20070055713 A | 5/2007 |
| RU | 2126604 C1 | 2/1999 |
| RU | 2263415 | 10/2005 |
| WO | WO-9512957 A1 | 5/1995 |
| WO | WO-9802008 A2 | 1/1998 |
| WO | WO-99055102 | 10/1999 |
| WO | WO-0067512 A1 | 11/2000 |
| WO | WO-0130103 A1 | 4/2001 |
| WO | WO-02100125 A1 | 12/2002 |
| WO | WO-2005013635 A1 | 2/2005 |
| WO | WO-2005065214 A2 | 7/2005 |
| WO | WO-2005096656 A1 | 10/2005 |
| WO | WO-2005116841 A1 | 12/2005 |
| WO | WO-2005122437 A1 | 12/2005 |
| WO | WO-2006056846 A1 | 6/2006 |
| WO | WO-2007040449 A1 | 4/2007 |
| WO | WO-2009026162 A1 | 2/2009 |

OTHER PUBLICATIONS

European Search Report—EP11175376—Search Authority—Munich—Sep. 1, 2011.
European Search Report—EP14175163—Search Authority—Munich—Aug. 20, 2014.
International Search Report and the Written Opinion—PCT/US2008/073333, International Search Authority—European Patent Office—Jun. 29, 2009.
Partial International Search Report—PCT/US2008/073333, International Search Authority—European Patent Office—Jan. 27, 2009.
Taiwan Search Report—TW097131500—TIPO—Feb. 17, 2012.

(56) References Cited

OTHER PUBLICATIONS

U.S. Appl. No. 14/307,416, filed on Jun. 17, 2014 by Mehmet Yavuz.

* cited by examiner

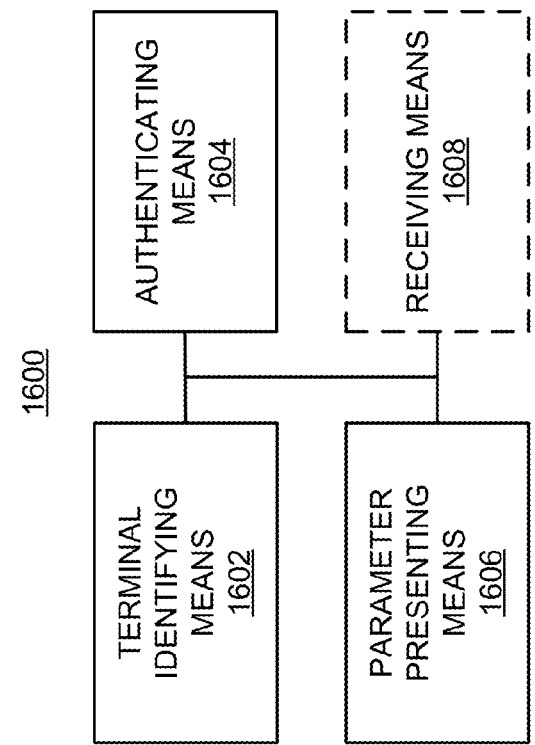
FIG. 16
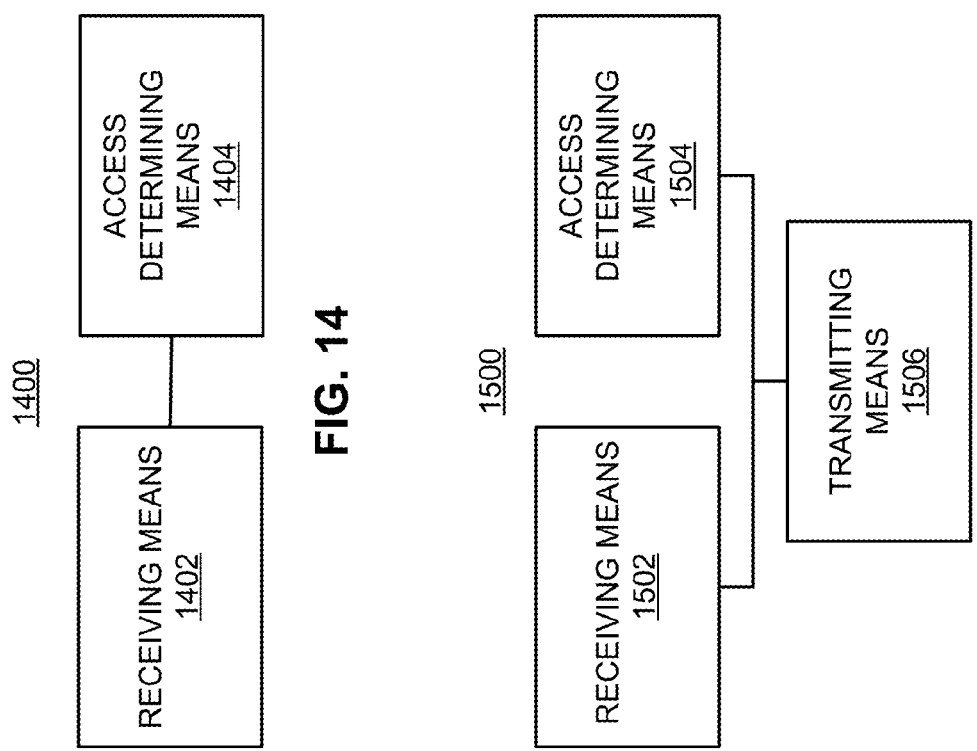
FIG. 14
FIG. 15

METHOD AND APPARATUS FOR INTERFERENCE MANAGEMENT

CLAIM OF PRIORITY UNDER 35 U.S.C. §119

This application is a divisional application of U.S. Non-Provisional application Ser. No. 12/191,250, filed Aug. 13, 2008, which claims the benefit of and priority to commonly owned U.S. Provisional Patent Application No. 60/965,164, filed Aug. 17, 2007. This application incorporates by reference those applications in their entireties.

CROSS-REFERENCE TO RELATED APPLICATION

This application is related to commonly owned U.S. patent application Ser. No. 12/191,256, entitled "METHOD AND APPARATUS FOR WIRELESS ACCESS CONTROL,", the disclosure of which is hereby incorporated by reference herein.

BACKGROUND

Field

This application relates generally to wireless communication and more specifically, but not exclusively, to improving communication performance.

Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement the base stations of a conventional mobile phone network (e.g., a macro cellular network), small-coverage base stations may be deployed, for example, in a user's home. Such small-coverage base stations are generally known as access point base stations, home NodeBs, or femto cells and may be used to provide more robust indoor wireless coverage to mobile units. Typically, such small-coverage base stations are connected to the Internet and the mobile operator's network via a DSL router or a cable modem.

In a typical macro cellular deployment the radio frequency ("RF") coverage is planned and managed by cellular network operators to optimize coverage. In such a deployment, an access terminal generally will connect to the best base station it hears for service. Here, RF planning may be employed in an attempt to ensure that the signal a given access terminal receives from a serving base station is sufficiently higher than the signals the access terminal receives from any interfering base stations, thereby enabling the access terminal to receive adequate service.

In contrast, deployment of small-coverage base stations may be ad-hoc and RF coverage of these base stations may not be optimized by the mobile operator. Consequently, RF interference, jamming, and out-of-service issues may arise between these base stations and nearby access terminals operating on a macro cell. For example, an access terminal that is not authorized to access a nearby base station (e.g., a femto cell) may be subjected to interference from that base station. Thus, there is a need for improved network interference management for wireless networks.

SUMMARY

A summary of sample aspects of the disclosure follows. It should be understood that any reference to the term aspects herein may refer to one or more aspects of the disclosure.

The disclosure relates in some aspects to assigning restricted access nodes (e.g., femto nodes) to a designated channel (e.g., carrier). Moreover, access terminals that are in active communication with a macro access node also may be assigned to the designated channel while access terminals that are idling on a macro access node are not assigned to the designated channel. In some cases, active access terminals with low-mobility may be assigned to the designated channel but active access terminals with high-mobility are not. In some aspects such a scheme may result in effective utilization of system resources while reducing interference between restricted access nodes and access terminals associated with macro access nodes.

The disclosure relates in some aspect to performing an inter-frequency handoff at an access terminal associated with a macro access node when the access terminal is in or near a coverage area of a restricted access node (e.g., a femto node). For example, when an access terminal that is associated with (e.g., in active communication with) a macro access node on a given carrier detects a femto node on the same carrier, the access terminal may switch to a different carrier for its macro communications if the carrier-to-interference ("C/I") at the access terminal worsens to a certain degree. Thus, this scheme also may reduce interference between restricted access nodes and access terminals associated with macro access nodes.

The disclosure relates in some aspect to performing an inter-frequency handoff based on a location of an access terminal. For example, an access terminal that is associated with (e.g., in active communication with) a macro access node on a given carrier may perform an off-frequency scan based on location information. In this way, the access terminal may determine whether it is within a coverage area of a designated (e.g., preferred) access node that is operating on a different carrier. If so, the access terminal may perform a handoff to the designated access node. In some aspects such a scheme may reduce interference between restricted access nodes and access terminals associated with macro access nodes by facilitating a handoff to a designated node if the access node is near the designated node.

The disclosure relates in some aspect to controlling access to a restricted access node. For example, when an access terminal attempts to gain access to a restricted access node the restricted access node and/or an access terminal (e.g., a home access terminal) that is associated with the restricted access node may determine whether to allow the requested access. In some aspects a decision as to whether to allow access is based on one or more defined policies. In some aspects a decision as to whether to allow access is based on a decision by a user of the access terminal that is associated with the restricted access node.

BRIEF DESCRIPTION OF THE DRAWINGS

These and other sample aspects of the disclosure will be described in the detailed description and the appended claims that follow, and in the accompanying drawings, wherein:

FIGS. 10-16 are simplified block diagrams of several sample aspects of apparatuses configured to assign carriers and control access as taught herein.

Figure 1:
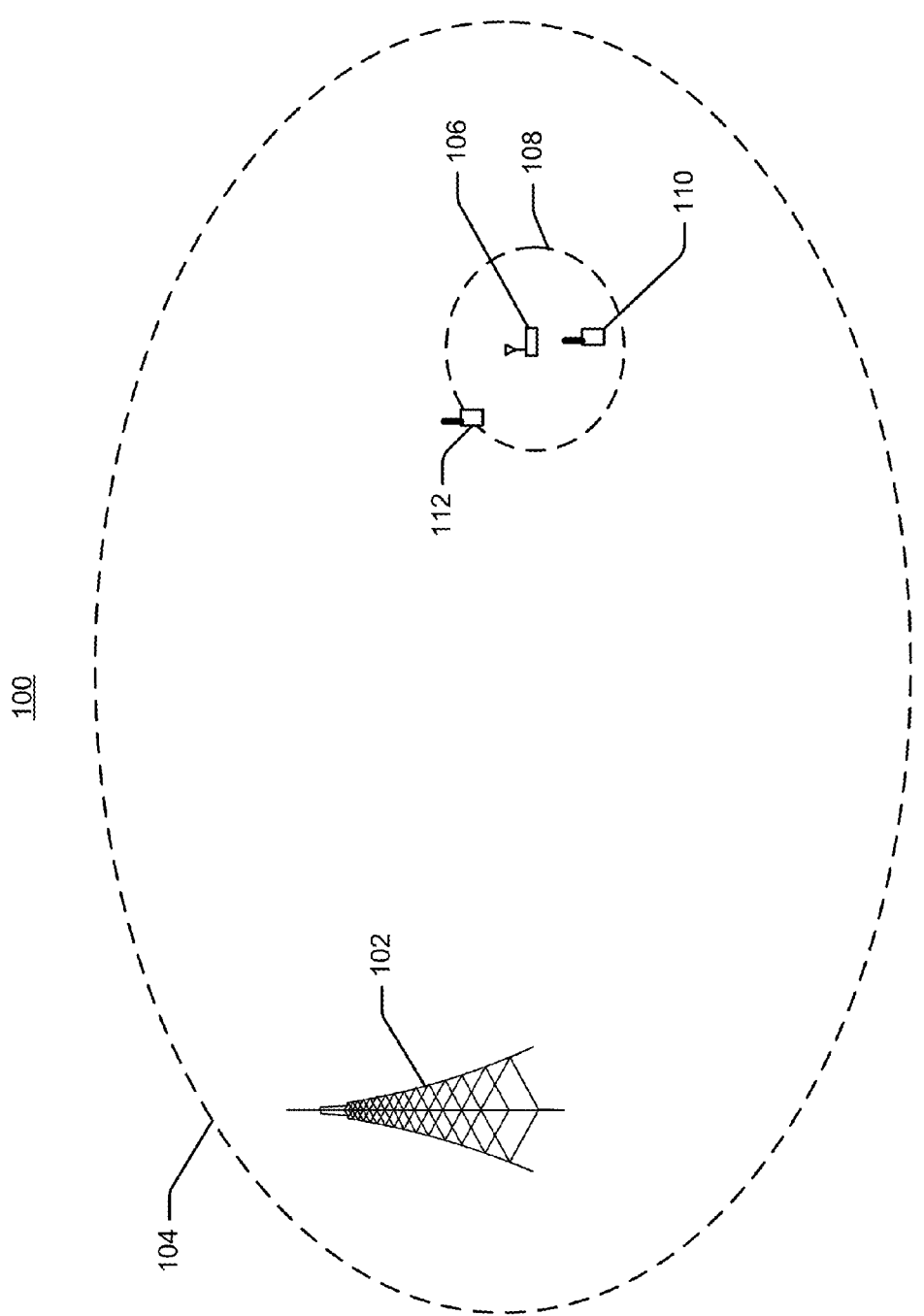
FIG. 1 is a simplified diagram of several sample aspects of a network including macro coverage and smaller scale coverage.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates sample aspects of a network system 100 where a macro access node 102 provides macro scale coverage 104 (e.g., a large area cellular network such as a 3G network) and an access node 106 provides coverage over a smaller coverage area 108 (e.g., a residence or a building). In some aspects, access nodes such as the access node 106 may be used to provide one or more of incremental capacity growth, in-building coverage, and different services (e.g., for a more robust user experience). Thus, as a node such as wireless terminal 110 moves through the network, the wireless terminal 110 may be served over a wide area by the access node 102 and at a specific sub-area by the access node 106. As will be discussed in more detail below, however, the access node 106 may be restricted in that it may only provide service to a defined set of nodes. As a result, a coverage hole (e.g., corresponding to the coverage area 108) may be created in the macro coverage area 104 for nodes such as wireless terminal 112 that are authorized to access the macro node 102 but are not authorized to access the access node 106.

A coverage hole such as this may affect both active and idle access terminals operating within the macro coverage area. For example, if an idle access terminal is denied registration at a restricted access node, the access terminal may experience C/I degradation (e.g., in the current channel and perhaps one or more adjacent channels). As a result, the access terminal may need to perform a handoff to another macro carrier. Similarly, if an active access terminal is denied association at a restricted access node, the access terminal may experience C/I degradation on the downlink, and also cause interference on the uplink at the restricted access node. The active access terminal also may attempt a handoff to another macro channel with better C/I. If such a channel cannot be found, however, the active call may be dropped due to loss of signal. Moreover, before the call is lost, transmissions from the access terminal may cause a temporary out-of-service condition at the restricted access node.

The disclosure relates in some aspects to managing access and/or interference issues that may arise when an access terminal is in the vicinity of a restricted access node. These and other aspects of the disclosure will be described with reference to a communication system 200 as shown in FIG. 2 and the flowcharts of FIGS. 3-6A.

The system 200 will be used to describe the scenario that follows. The wireless terminal 110 (e.g., a home access terminal) is associated with the access node 106 (e.g., a restricted base station) whereby the wireless terminal 110 may have full access at the access node 106. In addition, initially the wireless terminal 112 is associated with the access node 102 (e.g., a macro base station). At some point in time, the wireless terminal 112 enters the coverage area of the access node 106 and attempts to establish communication (e.g., as a guest access terminal). As will be described below, the system 200 also includes a centralized controller 202 that may communicate with the access nodes 102 and 106 (e.g., over backhaul connections).

Figure 2:
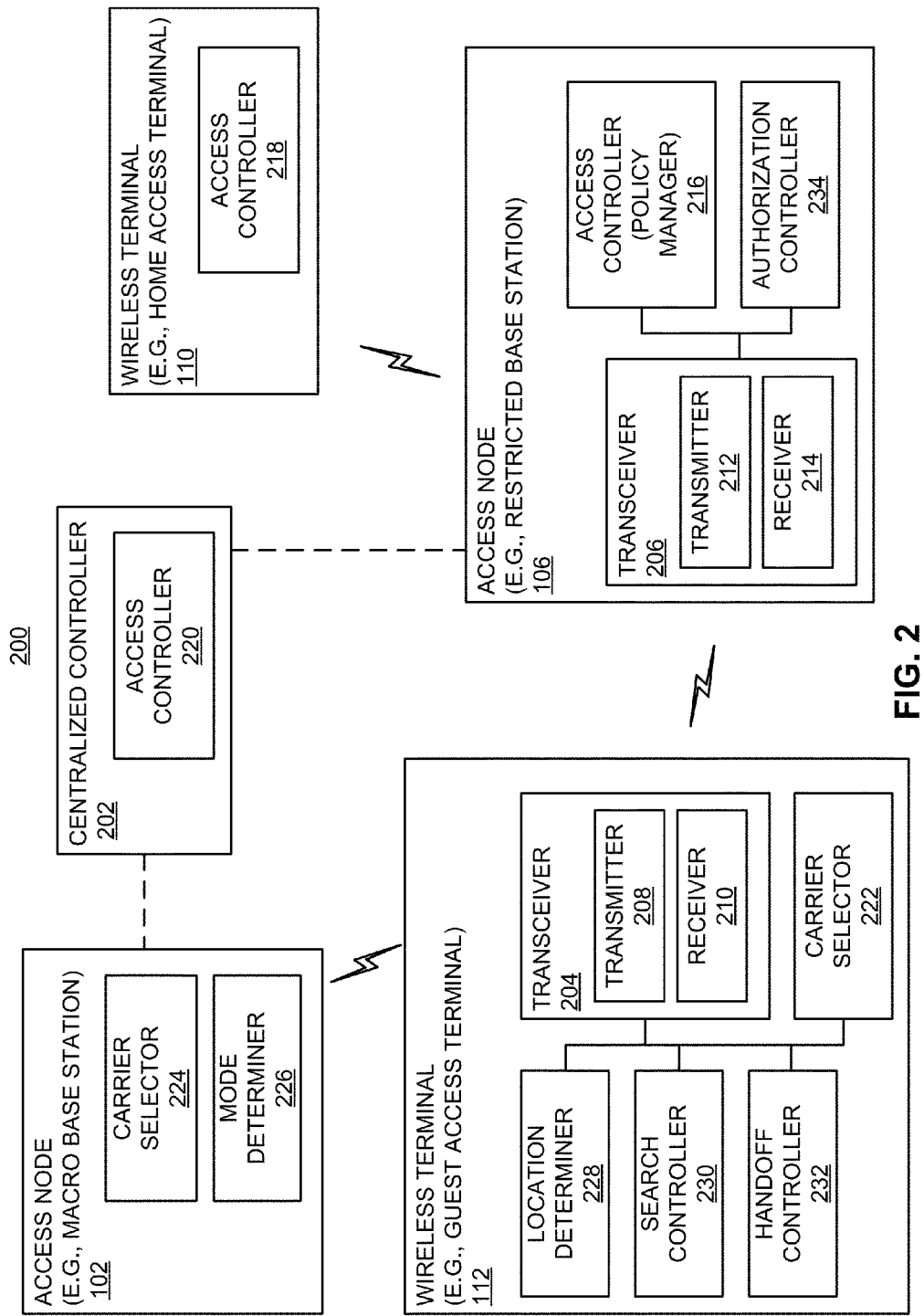
FIG. 2 is a simplified block diagram of several sample aspects of a communication system.

FIG. 2 also illustrates several sample components that may be implemented in these nodes in accordance with the teachings herein. To reduce the complexity of FIG. 2, only a few components are shown in the various nodes. It should be appreciated that similar components may be incorporated into other nodes in the system, irrespective of whether this is shown in FIG. 2. The nodes including transceivers for communicating with each other and with other nodes. For example, a transceiver 204 of the node 112 includes a transmitter 208 for sending signals and a receiver 210 for receiving signals. A transceiver 206 of the node 106 includes a transmitter 212 for transmitting signals and a receiver 214 for receiving signals. The nodes also may include access controllers (e.g., access controllers 216, 218, and 220) for controlling access to a node and for providing other related functionality as taught herein. The nodes also may include communication controllers (not shown) for managing communications with other nodes and for providing other related functionality as taught herein. The other components illustrated in FIG. 2 will be discussed in the disclosure that follows.

Figure 3:
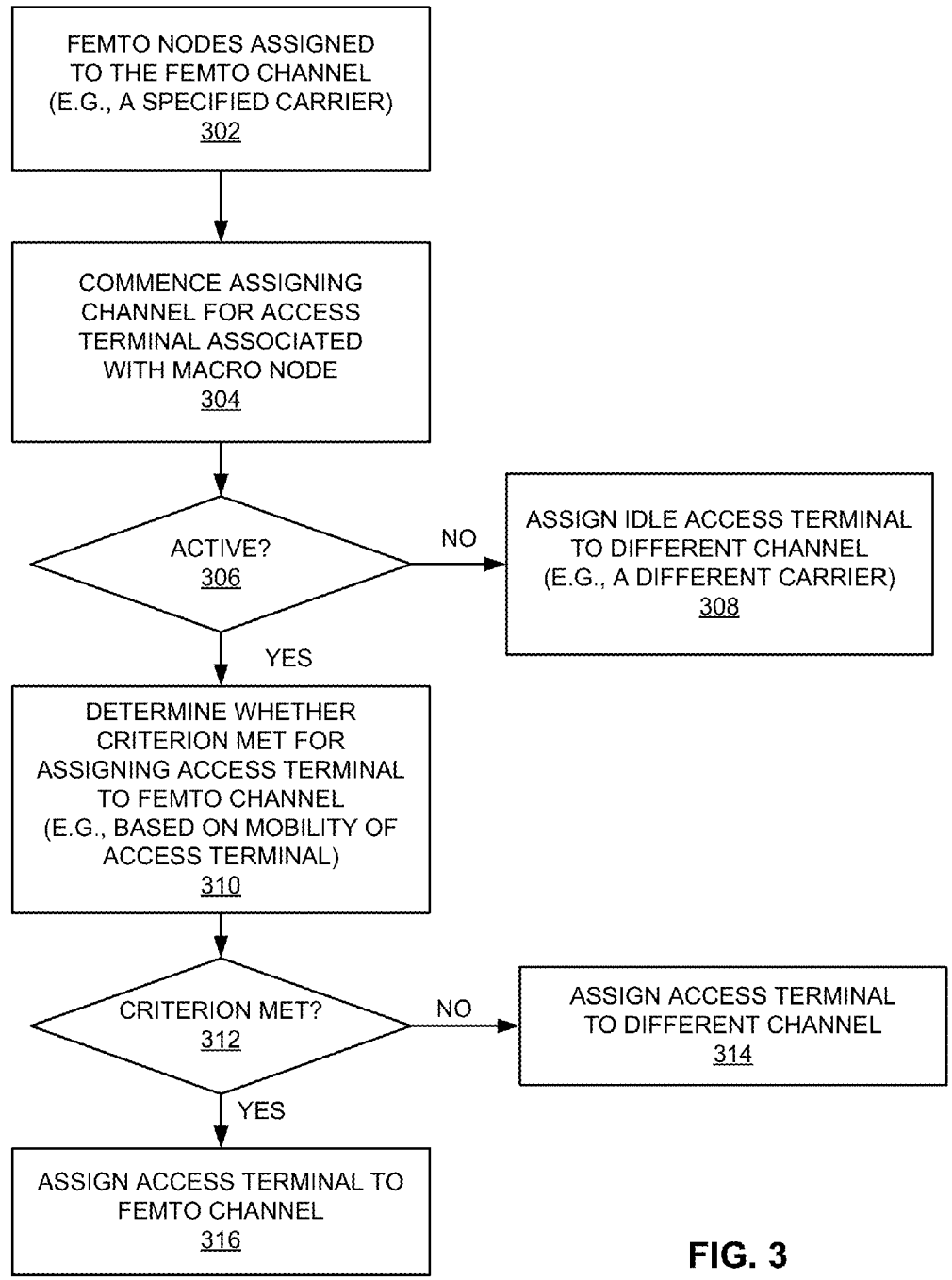
FIG. 3 is a flowchart of several sample aspects of operations that may be performed to assign carriers for wireless nodes.
Figure 4:
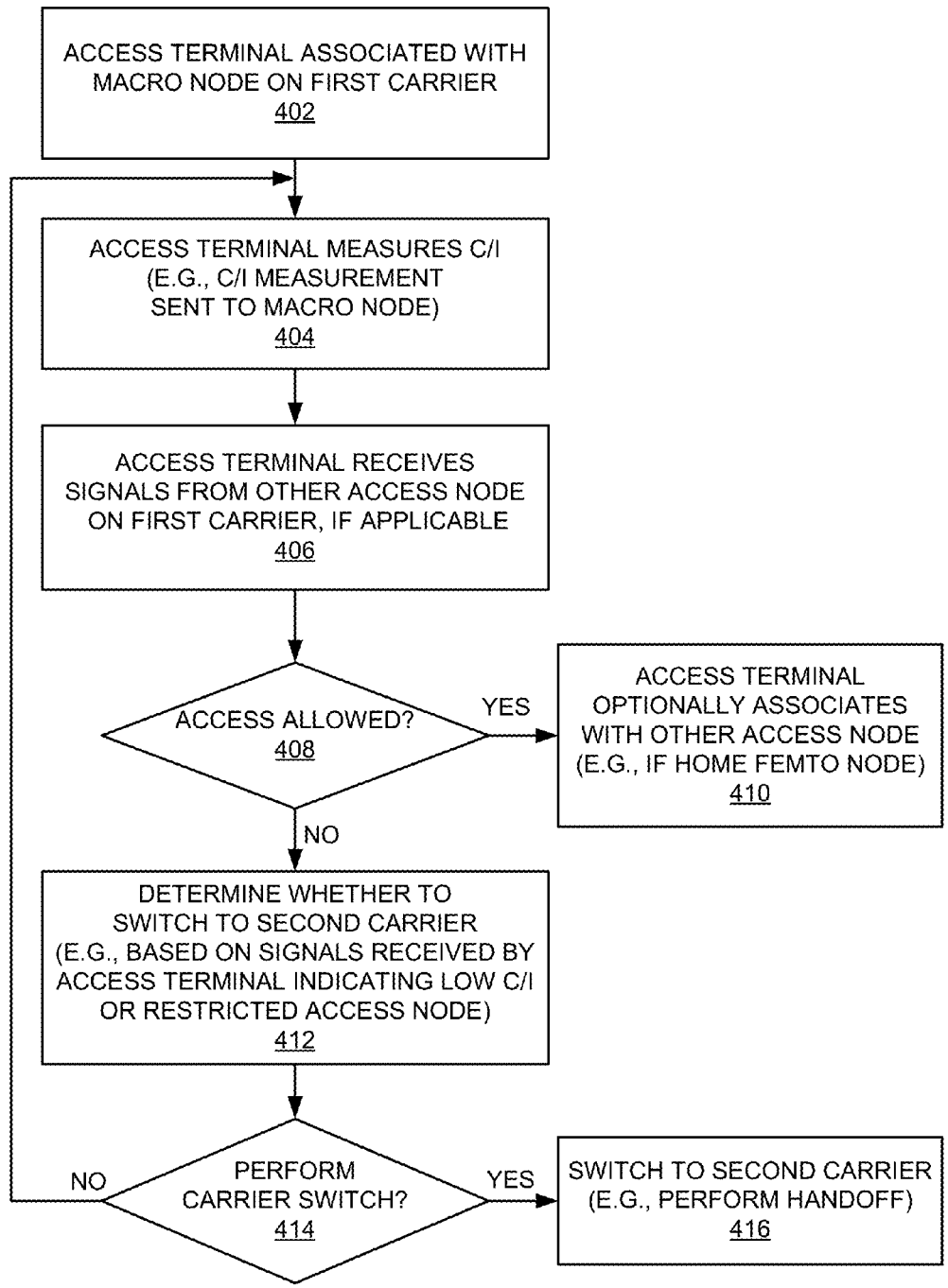
FIG. 4 is a flowchart of several sample aspects of operations that may be performed to perform a handoff to another carrier based on received signals.
Figure 5:
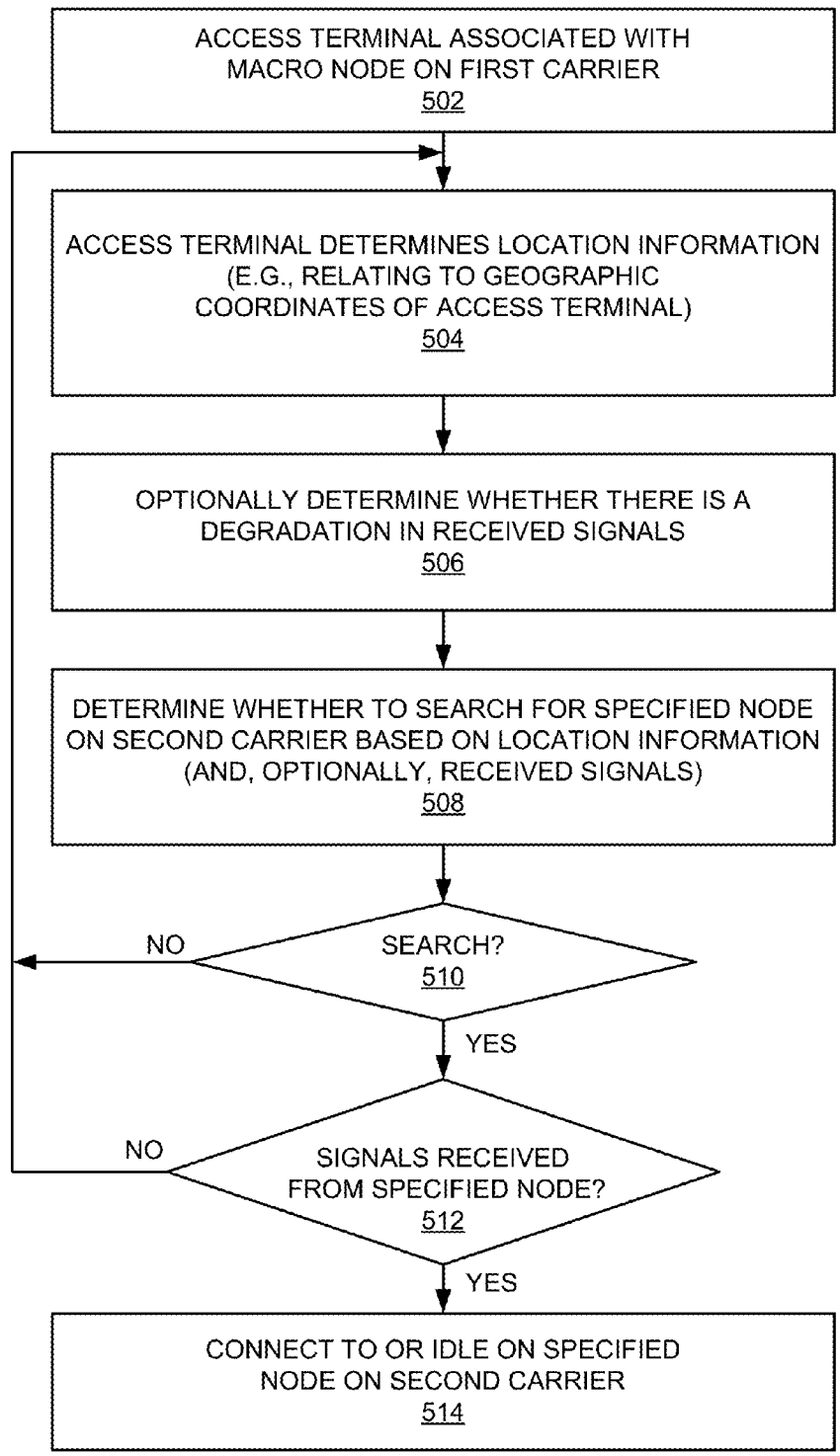
FIG. 5 is a flowchart of several sample aspects of operations that may be performed to perform a handoff to another carrier based on location information.
Figure 6A:
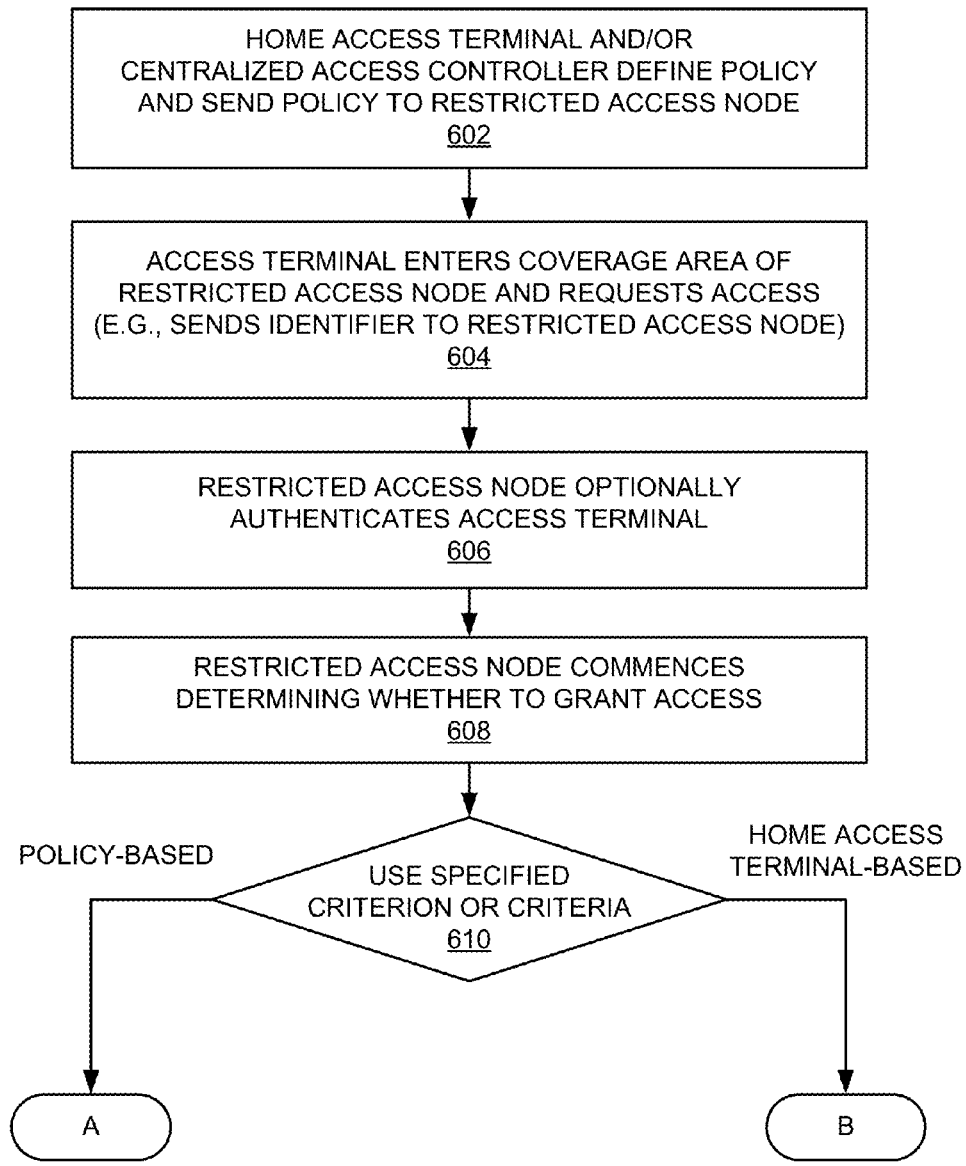
FIGS. 6A and 6B are a flowchart of several sample aspects of operations that may be performed to control access to a restricted access node.
Figure 6B:
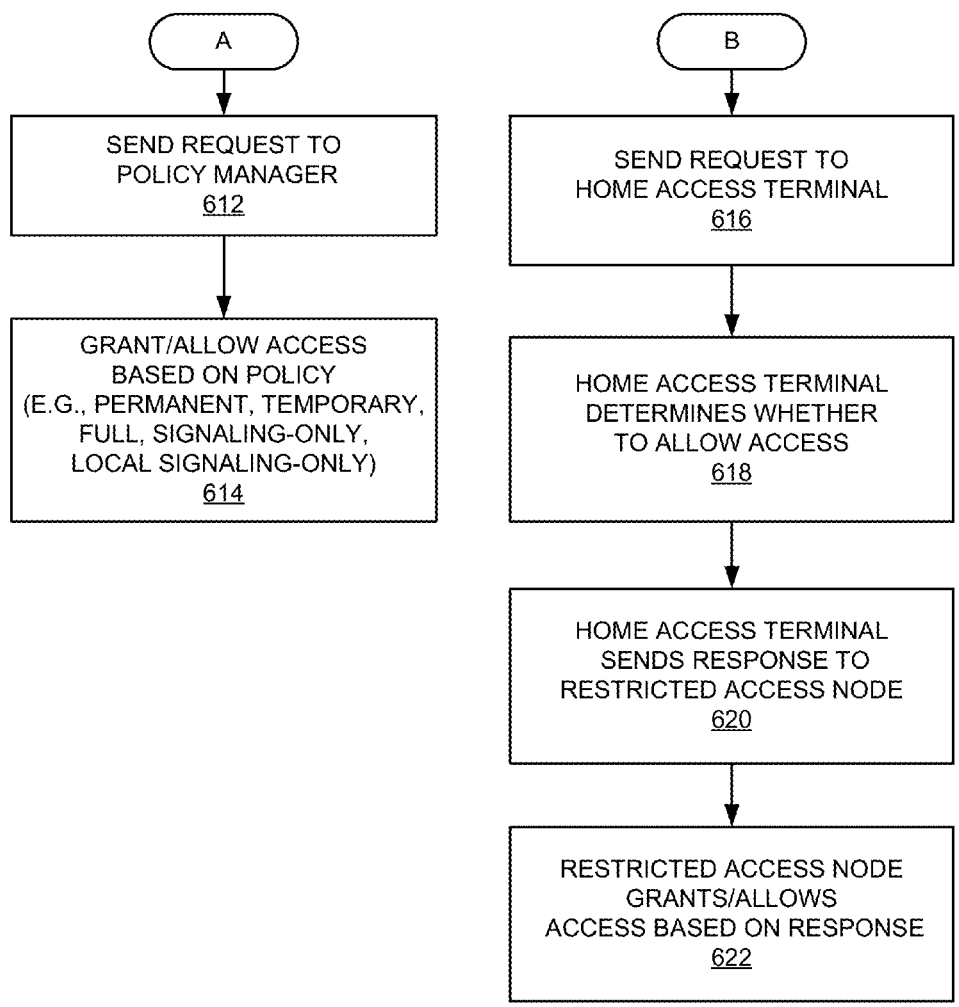

Sample operations of a system such as the system 200 will now be treated in more detail in conjunction with the flowcharts of FIGS. 3-6B. Briefly, FIG. 3 describes several operations that may be employed in conjunction with assigning carriers to nodes in a system. FIG. 4 describes several operations that may be employed in conjunction with switching to another carrier based on detected signals. FIG. 5 describes several operations that may be employed in conjunction with switching to another carrier based on location information. FIGS. 6A and 6B describe several operations that may be employed in conjunction with controlling access to a restricted node.

For convenience, the operations of FIGS. 3-6B (or any other operations discussed or taught herein) may be described as being performed by specific components (e.g., components of the system 200). It should be appreciated, however, that these operations may be performed by other types of components and may be performed using a different number of components. It also should be appreciated that one or more of the operations described herein may not be employed in a given implementation.

For illustration purposes the following description is presented in the context of access terminals (e.g., nodes 110 and 112) that communicate with a macro access node and a restricted access node (e.g., nodes 102 and 106, respectively). It should be appreciated, however, that the teachings herein may be applicable to other types of apparatuses or apparatuses that are referred to using other terminology.

Referring initially to FIG. 3, the channels (e.g., carriers) on which femto nodes and on which access terminals associated with macro nodes are deployed may be controlled to mitigate interference that may otherwise be caused by a restricted access node operating on the same channel as a macro node. Moreover, this may be accomplished while maintaining sufficient utilization of the channels.

As represented by block 302, all of the restricted access nodes in the system may be assigned to a common channel. For example, all of the femto nodes in a given operator's network may be deployed on the same carrier (designated the femto channel). In FIG. 2, such a configuration may be achieved, for example, by cooperation of the centralized controller 202 and the access node 106.

Blocks 304-316 describe a procedure that may be employed to assign a channel for an access terminal operating within a macro cell. Such a procedure may be implemented, for example, by cooperation of carrier selector components 222 and 224 of the nodes 112 and 102, respectively. For example, the carrier selector 224 may configure the carrier selector 222 to operate on a designated carrier.

The channel assignment procedure commences at block 304 (e.g., in conjunction with making a call assignment). As represented by block 306, this channel assignment may be based on whether the access terminal is currently active (e.g., in-call) or idle. In some implementations, the access terminal's current mode may be determined by a mode determiner component 226 as shown in FIG. 2.

As represented by block 308, if the access terminal is idling on a macro node, the access terminal may be assigned to a different channel than the femto channel if an alternate channel is available. In some aspects, idle macro access terminals may only need paging and other limited services. Hence, there may not be as great of a need to load-balance these access terminals across all channels. By not placing idle macro access terminals on the femto channel, idle handoffs that may be otherwise performed when the idle macro access terminal encounters the femto node may be avoided. In the event the access terminal switches to an active mode (e.g., when the access terminal receives a call), the access terminal may be assigned a different channel at that time (e.g., in conjunction with a call assignment).

As represented by block 310 and 312, active macro access terminals may be assigned to the femto channel under some circumstances. In some aspects the assignment of a macro access terminal to a femto channel may take into account whether such an assignment may result in relatively high overhead. For example, it may be undesirable to place an access terminal that has high mobility on the femto channel since this may result in a relatively large number of handoffs as the access terminal passes by different femto nodes in the network. In contrast, if the access terminal is relatively stationary and not within the coverage of a femto node, there may be a much lower likelihood of interference with femto nodes and inter-frequency handoffs. In this case, placing the access terminal on the femto channel may result in better utilization of the femto channel.

Accordingly, in some aspects a determination of whether to assign a macro access terminal to the femto channel may be based on the nobility of the access terminal. Such a determination may be made, for example, by comparing a mobility metric associated with the access terminal with one or more threshold mobility metric values. Thus, as represented by block 314, in the event the mobility of the access terminal is greater than equal to a threshold mobility value, the access terminal may be assigned to a channel that is different than the femto channel. Conversely, as represented by block 316, in the event the mobility of the access terminal is less than or equal to a threshold mobility value the access terminal may be assigned to the femto channel.

A mobility metric as described above may be implemented in various ways. For example, in some implementations a low-speed/high-speed classifier may be implemented in new access terminals. In some implementations the mobility of an access terminal may be determined based on whether an active access terminal on the femto channel frequently provides femto node C/I reports (e.g., to the macro access node). Here, the access terminal may generate a report every time it encounters signals from a different femto node. In the event the rate of these reports meets or exceeds a certain threshold, the access terminal may be directed away from the femto channel. Also, in the event femto node deployments become widespread in a network, the femto channel may be solely dedicated to femto nodes.

Referring now to FIG. 4, when an access terminal approaches a coverage hole on its current operating carrier (e.g., caused by restricted node), the access terminal may switch to a different carrier (e.g., in cooperation with a serving access node). The operations of FIG. 4 commence at block 402 where the access terminal 112 is initially associated with a macro access node 102 on a given carrier (e.g., designated as the first carrier).

As represented by block 404, the access terminal 112 (e.g., the receiver 210) will receive signals on the first carrier from the access node 102 and, potentially, other nearby access nodes. The access terminal 112 may thus determine the C/I associated with signals (e.g., pilot signals) received from the access node 102. In some implementations the access terminal 112 (e.g., the transmitter 208) may send this C/I information to the access node 102.

As represented by block 406, as the access terminal 112 approaches a coverage area of another access node, the access terminal 112 also may receive signals from that access node on the first carrier. As represented by block 408, the access terminal 112 may determine whether it is allowed to access the access node detected a block 406.

As represented by block 410, if the access terminal 112 is allowed to access the access node, the access terminal 112 may elect to associate with that access node. For example, one or more access nodes may be designated as preferred access nodes (e.g., a home femto node) for the access terminal 112. In such a case, the access terminal 112 may be configured to associate with a preferred access node whenever the access terminal 112 detects the presence of such a node. To this end, in some implementations the access terminal 112 may maintain a preferred roaming list ("PRL") that identifies its preferred access nodes.

If the access terminal 112 is not allowed to access the access node at block 408 (e.g., the access node is restricted to provide service to some other access terminal), the access terminal 112 and/or a serving access node may determine whether to switch to a different carrier at blocks 412, 414, and 416. For example, in some cases the access terminal 112 (e.g., the carrier selector 222) may elect to switch to a different carrier based on detection of signals from a restricted access node (e.g., access node 106) and/or based on a determination that the C/I on the first carrier has degraded (e.g., due to interference from the access node 106 operating on the first carrier). Here, degradation of C/I may be indicated, for example, if the C/I is less than or equal to a threshold value.

In some cases, one or more of the above operations may be implemented by cooperation of the access terminal 112 and the access node 102. For example, the access terminal may send information relating to the signals received at blocks 404 and 406 to the access node 102. Then, based on detection of degraded C/I at the access terminal 112 and/or the presence of the restricted access node 106 (and/or a preferred access node) as indicated by the information, the access node 102 (e.g., the carrier selector 224) may invoke a handoff operation. As a result, the access terminal 112 may switch to the second carrier and attempt to establish communication.

The above procedure may be used when the access terminal is in either an idle mode or an active mode. For example, if a macro access terminal idling on the femto channel detects degraded C/I due to a nearby restricted femto node, the access terminal may initiate idle handoff operations. Here, if the access terminal determines that the femto node is either open or grants access to the access terminal, the access terminal may simply associate with the femto node as described above at block 410. If, on the other hand, the access terminal is not allowed to associate with the femto node, the access terminal may perform a scan in an attempt to find macro coverage signals on another carrier.

If a macro access terminal that is in active communication on the femto channel detects degraded C/I due to a nearby restricted femto node, the access terminal may send a C/I report to its macro node along with information about the femto node as discussed above. The macro access node may then determine that the C/I degradation is due to interference from the femto node and initiate an active inter-frequency handoff.

If a request by the access terminal 112 to associate with the access node 106 is denied and no alternative carrier is available within the coverage area of the access node 106, the access terminal 112 may drop its call. In such a case, the access terminal 112 may end up in an idle state (e.g., within the coverage of the access node 106)

In any event, the access terminal 112 may continue to monitor received signals as represented by operational flow back to block 404 (e.g., on the original carrier or the new carrier). In this way, the access terminal 112 may repeatedly monitor for coverage holes caused by nearby restricted access nodes and attempt to mitigate any associated interference.

Referring now to FIG. 5, it may be desirable for an access terminal to conduct off-frequency scans to determine whether it has entered a coverage area of an access node that is operating on a different carrier. For example, if a preferred access node has been designated for an access terminal (e.g., in a PRL), the access terminal may repeatedly conduct off-frequency scans in an attempt to detect signals (e.g., pilot signals) from the preferred access node. The operations of FIG. 4 commence at block 502 where the access terminal 112 is initially associated with a macro access node 102 on a given carrier (e.g., designated as the first carrier).

As represented by block 504, the access terminal 112 (e.g., a location determiner 228) determines location information that may be used to determine whether the access terminal 112 is in the vicinity of a given access node. This location information may take various forms. For example, in some implementations the location information may comprise a geographic location of the access terminal 112. In such a case, the location determiner 228 may include functionality (e.g., GPS functionality, cellular functionality, and so on) for determining this geographic location.

As represented by block 506, in some implementations the access terminal 112 also may determine whether it is experiencing any degradation in its received signals. For example, a decision to switch to another carrier also may be based on whether the signal from the macro access node 102 is becoming weak (e.g., C/I is degrading).

As represented by blocks 508 and 510, the access terminal 112 (e.g., a search controller 230) may determine whether to conduct an off-frequency scan to search for one or more other access nodes. As mentioned above, such a scan may be invoked based on the location information (e.g., by determining whether the access terminal 112 is proximate to a given access node operating on a different carrier). For the case of geographic-based location information, the search controller 230 may, for example, determine whether to conduct a search based on a comparison of the current geographic location as determined at block 504 with a known location of the specified access node.

Determining proximity to a given access node may be accomplished in various ways. For example, when access nodes such as femto nodes are setup (e.g., upon installation), each access node may upload its coordinates (e.g., latitude and longitude) together with identification information (e.g., its PN and sector ID) to a database. This information may be sent, for example, via an IP backhaul.

As discussed above, the access terminal determines where it is based on, for example, coordinates from a GPS component. The access terminal may then access the database (e.g., the access terminal may be configured a priori with the URL of the database) and query the database for any access nodes (e.g., femto nodes) in the vicinity of the access terminal. If the access terminal determines that there is such an access node in the vicinity, the access terminal may conduct an off-frequency search in an attempt to find the access node.

The use of such a centralized database may advantageously simplify network management. For example, when a new access node (e.g., femto node) is installed, the centralized database may be updated. An access terminal may then query that database whenever it needs to. In some aspects, an implementation such as this may be more efficient than, for example, an implementation where the PRL for an access terminal is updated every time a new access node is installed.

As mentioned above a decision to conduct a scan may optionally be based on any degradation in the signals received on the first carrier. For example, the access terminal 112 may be more likely to conduct a scan when the signal degradation is high.

As represented by block 512, the access terminal 112 determines whether any signals are received on the second carrier. If so, the access terminal 112 may elect to perform a handoff to associate with an access node operating on the second carrier (block 514). For example, if the access terminal 112 (e.g., a handoff controller 232) detects a home femto node on the second carrier, the access terminal 112 may elect to associate with that home femto node. If the access terminal 112 is in an active mode (e.g., in-call), appropriate context transfer procedures may be used to perform an active handoff.

If the access terminal 112 is denied access to a restricted access node (e.g., access node 106) while in idle mode, the access terminal 112 may request association with the access node. If the access terminal 112 is denied access to the access node while in active mode, the call may drop if the coverage on the first carrier runs out. In such a case, the access terminal 112 may end up in an idle mode within the coverage of the access node.

The initiation of a procedure that determines whether to switch to another carrier may be accomplished in various ways and based on various criteria. For example, in some cases a macro access node that is aware of the possible existence of a femto access node may request an access terminal to perform an off-frequency search at a frequency that is periodically specified by the network. In some cases, a femto node may send a request for an off-frequency search to an access terminal that is connected to it to determine whether it is appropriate to handout (e.g., to a macro access node).

As mentioned above, when a guest (or alien) access terminal approaches a restricted access node, interference, jamming, and out-of-service conditions may occur. To mitigate such conditions, the access node may grant some form of access to the access terminal in accordance with the teachings herein. For example, the access node may grant temporary access, restricted access, or some other form of access to the access terminal. These and other aspects of the disclosure will now be described in conjunction with FIGS. 6A and 6B. For convenience, a restricted access node will be referred to as the access node 106 in the following discussion. Similarly, a guest or alien access terminal (e.g., which may be granted guest access) will be referred to as the access terminal 112.

As represented by block 602, in some aspects access to a restricted access node may be based on policy defined for the access node 106. As will be described in more detail below, such policy may relate to, for example, one or more of which access terminals may be granted access, how long the access terminals may be granted access, and whether there are any restrictions on this access.

In some aspects, the access controller 216 (e.g., implementing a policy manager) located at the access node 106 determines whether the access terminal 112 is permitted to access the access node 106 (e.g., as a guest access terminal). In some cases, policy for the access node 106 may be defined by another node in the network. For example, an access controller 220 (e.g., a policy manager) implemented at the centralized controller 202 (e.g., a central access management function managed by an operator or service provider) and/or an access controller 218 (e.g., a policy manager) implemented at an associated home access terminal may define the policy implemented by the access controller 216. These entities may then send the policy to the access node 106 via an appropriate communication link (e.g., wired or wireless) to configure or update policy at the access node 106. In some cases, policy associated with one policy manager (e.g., the access controller 220) may override policy associated with another policy manager (e.g., the access controller 218). For convenience, in the following discussion a home access terminal will be referred to simply as the access terminal 110.

As represented by block 604, at some point in time the access terminal 112 may enter the coverage area of the access node 106. In addition, the access terminal 112 may request access to the access node 106 (e.g., access to the coverage area) in some manner. In some cases the request may be sent via a message such as an SMS message. In some cases the access terminal 112 may initiate a request by attempting to register with the access node, initiate a call with the access node, or handoff to the access node (e.g., when in an active state). In conjunction with such a request, the access terminal 112 may send an identification parameter to the access node 106.

As represented by block 606, upon receipt of the request by the access node 106 (e.g., the receiver 214), the access node 106 may authenticate the access terminal 112. For example, the access node 106 (e.g., an authorization controller 234) may issue a challenge to the access terminal 112 and verify any response it receives from the access terminal 112. In some implementations, the access node 106 may cooperate with an authorization, authentication, and accounting server (e.g., associated with the centralized controller 202) to authenticate the access terminal 112 (e.g., by authenticating a user name or some other identifier associated with the access terminal 112).

As represented by block 608, the access controller 216 then commences determining whether to grant access to the access terminal 112. As represented by block 610, this determination may be based on the policy implemented by the access controller 216 and, optionally, input from the access terminal 110. As an example of the latter scenario, the owner of the access node 106 may use the access terminal 110 to authorize a guest access terminal to use the access node 106.

The policy-based operations will be described first with reference to blocks 612 and 614. As represented by block 612, a request may be provided to the policy manager of the access node 106 requesting to allow the access terminal 112 to gain access to (e.g., register with) the access node 106. As represented by block 614, based on the policy, the access node 106 may then deny the request or grant the request (e.g., allowing temporary or permanent access). The policy implemented the access node 106 may take various forms. For example, a policy may involve one or more of the criteria set forth below.

In some aspects a policy may comprise an access control list that identifies permitted access terminals and/or non-permitted access terminals. Here, the access controller 216 may compare an identifier of the access terminal 112 with the access control list to determine whether to permit access.

In some aspects a policy may allow all requests to be temporarily admitted for a specified duration and permit some form of restricted access. For example, the access terminal 112 may be granted access for 15 minutes, one hour, and so on, and/or the access terminal 112 may be granted access at certain times. In this way, potential out-of-service events may be avoided at the access node 106.

In some aspects a policy may grant permanent access to certain access terminals (e.g., permanently entered into the closed user group). For example, an owner may grant permanent access to a neighbor access terminal. Such cooperation between neighbors may benefit both parties by achieving improved grade of service for each neighbor.

In some aspects a policy may define different types of access that may be permitted under different circumstances.

For example, the policy may grant access to any access terminal that is attempting to make an e911 call.

In some aspects a policy may depend on the call state of the access terminal 112. For example, a response to a registration request may depend on whether the access terminal 112 is in an idle mode or an active mode. As a more specific example, a policy manager may be configured to automatically offer temporary service to the access terminal 112 if the access terminal 112 is an active mode. Conversely, a policy manager may be configured to notify one or both of the access controllers 218 and 220 whenever a request is received from the access terminal 112 when it is idling, whereby these entities may play a part in determining whether to grant access to the access terminal 112.

In some aspects, a policy may depend on the signal strength of signals received at the access node 106 (e.g., from the access terminal 112). For example, a policy manager may be configured to automatically offer temporary service to the access terminal 112 if the signal strength from the access terminal 112 exceeds a threshold (e.g., to reduce interference at the access node 106). In addition, when the measured rise over thermal and the noise floor at the access node 106 is approaching an out-of-service threshold, a policy may permit temporary access to the access terminal 112 to avoid an out-of-service condition at the access node 106. In some aspects the access node 106 may be designed with a relaxed rise over thermal limit to allow the access terminal 112 to transmit at a higher power that causes a larger rise over thermal than what may be typical in a macro cellular deployment. In this way, the number of out-of-service events at the access node 106 may be reduced.

In some aspects a policy may define different types of access (e.g., in conjunction with temporary access). For example, a policy may specify that the access terminal 112 is to be provided full association (e.g., full-service) by the access node 106.

Alternatively, a policy may specify that the access terminal 112 is to be provided less than full service (e.g., to restrict consumption of resources such as bandwidth at the access node 106). For example, the access terminal 112 may be restricted to signaling-only association. Here, the access terminal 112 may be admitted to the access node 106 via a path provided for signaling. The access terminal 112 may thus send signaling to and receive signaling from the access node 106, or some other network element (e.g., a macro RNC). This type of signaling may relate to, for example, paging, mobility signaling, and registration. However, the access terminal 112 is not allowed to send or receive user traffic through the access node 106 (e.g., call setup is not permitted).

In yet another example, a policy may specify that the access terminal 112 is to be restricted to local signaling-only association. This signaling may involve, for example, locally generated signaling such as redirection messages, resource utilization messages (e.g., to control interference), and power control messages. In some aspects, this signaling may relate to media access control ("MAC") level operations. Here, no signaling connection is provided to the core network. In addition, paging and mobility-related signaling is not supported.

Referring now to blocks 616-622, in some implementations the access node 106 may obtain permission from a user (e.g., the owner of the access node 106) before granting access to the access terminal 112. For example, at block 616 the access node 106 (e.g., the transmitter 212) may forward a request (e.g., a guest access request) and/or other related information to the access terminal 110. As mentioned above, in some implementations this request may include an authenticated identification parameter associated with the access terminal 112 (e.g., a user name). It should be appreciated that the access terminal 110 is not required to be present in the coverage area of the access node 106. Rather, this message exchange with the access terminal 110 may be employed as long as the access terminal 110 is in service somewhere in the network (e.g., when the access terminal 110 is registered somewhere in an associated wide area network).

As represented by block 618, based on the receipt of this request (e.g., by a receiver, not shown), the access terminal 110 (e.g., the access controller 218) may determine whether to permit the requested access. In some implementations this may involve outputting a notification relating to the request via an output device (not shown) of the access terminal 110. For example, a request may be displayed on a display device of the access terminal 110. The user of the access terminal 110 may then use an input device (not shown) of the access terminal 110 to provide a response to the request that indicates whether the request is allowed (and, optionally, the form of access allowed).

As represented by block 620, the access terminal 110 (e.g., a transmitter, not shown) may then send an appropriate response to the access node 106. As mentioned above, this response may authorize access to the access terminal 112 (e.g., associated with an authenticated identification parameter provided at block 616). Upon receipt of this response by its receiver 214, the access node 106 may then grant or allow the requested access based on the response (block 622).

In some cases, the operations of the access terminal 110 employ policy similar to the policy described above (e.g., as implemented by the access controller 218). In some cases, the access terminal 110 may configure the policy manager of the access node 106 with an identifier of an access terminal before the access terminal arrives in the coverage area of the access node 106. For example, as mentioned above a user may elect to authorize a neighbor to access the access node 106. In such a case, the user may cause an appropriate entry to be made to the access control list maintained by the access node 106.

It should be appreciated that access manager functionality may be implemented in a variety of ways in accordance with the teachings herein. For example, in some implementations a femto node manager may be employed to temporarily or permanently admit access terminals to a closed user group and permit access to a restricted femto node. In one example, where one or more devices belong to a homeowner, an access terminal may be configured to be a femto node manager if it is assigned access terminal function manager status. In another example, a service provider may deploy a network element with femto node manager function to apply service provider policies on closed user group management. The service provider may configure either the access terminal femto node manager or the femto node manager function in the network to override the other.

In view of the above it should be appreciated that the teachings herein may be advantageously employed to mitigate interference in a wireless communication system. Moreover, through the use of higher-level procedures such as handoffs and association procedures, interference issues may be addressed in a more effective manner in some aspects as compared to, for example, techniques that may address these issues via lower layer (e.g., PHY and/or MAC) modifications (e.g., by adapting radio parameters or employing time division multiplexing).

As mentioned above, in some aspects the teachings herein may be employed in a network that includes macro scale coverage (e.g., a macro cellular network environment) and smaller scale coverage (e.g., a residential or building network environment). In such a network, as an access terminal ("AT") moves through the network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, a given cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a home NodeB, home eNodeB, access point base station, femto cell, and so on.

Figure 7:
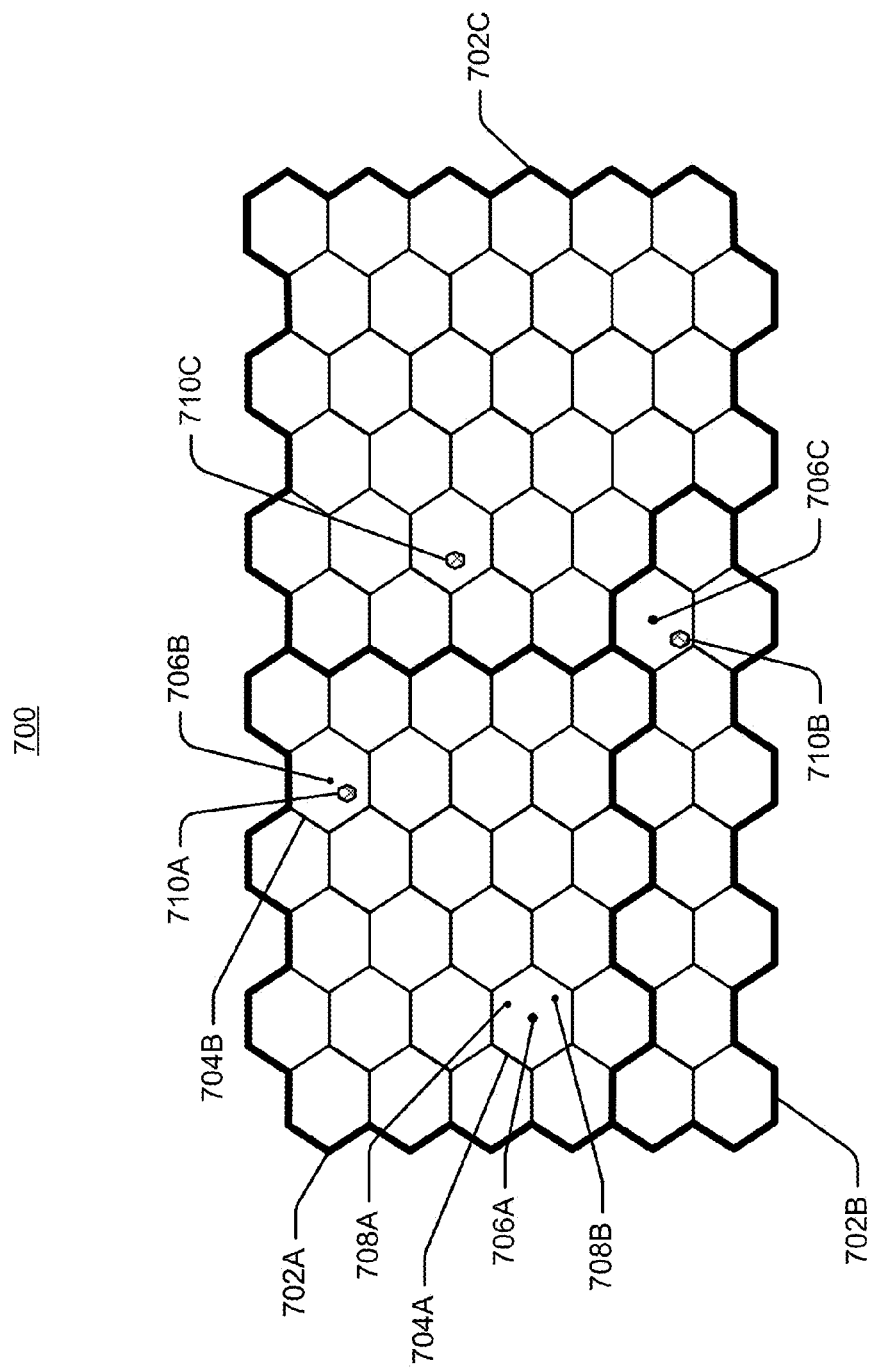
FIG. 7 is a simplified diagram illustrating coverage areas for wireless communication.

FIG. 7 illustrates an example of a coverage map 700 for a network where several tracking areas 702 (or routing areas or location areas) are defined. Specifically, areas of coverage associated with tracking areas 702A, 702B, and 702C are delineated by the wide lines in FIG. 7.

The system provides wireless communication via multiple cells 704 (represented by the hexagons), such as, for example, macro cells 704A and 704B, with each cell being serviced by a corresponding access node 706 (e.g., access nodes 706A-706C). As shown in FIG. 7, access terminals 708 (e.g., access terminals 708A and 708B) may be dispersed at various locations throughout the network at a given point in time. Each access terminal 708 may communicate with one or more access nodes 706 on a forward link ("FL") and/or a reverse link ("RL") at a given moment, depending upon whether the access terminal 708 is active and whether it is in soft handoff, for example. The network may provide service over a large geographic region. For example, the macro cells 704 may cover several blocks in a neighborhood.

The tracking areas 702 also include femto coverage areas 710. In this example, each of the femto coverage areas 710 (e.g., femto coverage areas 710A) is depicted within a macro coverage area 704 (e.g., macro coverage area 704B). It should be appreciated, however, that a femto coverage area 710 may not lie entirely within a macro coverage area 704. In practice, a large number of femto coverage areas 710 may be defined within a given tracking area 702 or macro coverage area 704. Also, one or more pico coverage areas (not shown) may be defined within a given tracking area 702 or macro coverage area 704. To reduce the complexity of FIG. 7, only a few access nodes 706, access terminals 708, and femto nodes 710 are shown.

Figure 8:
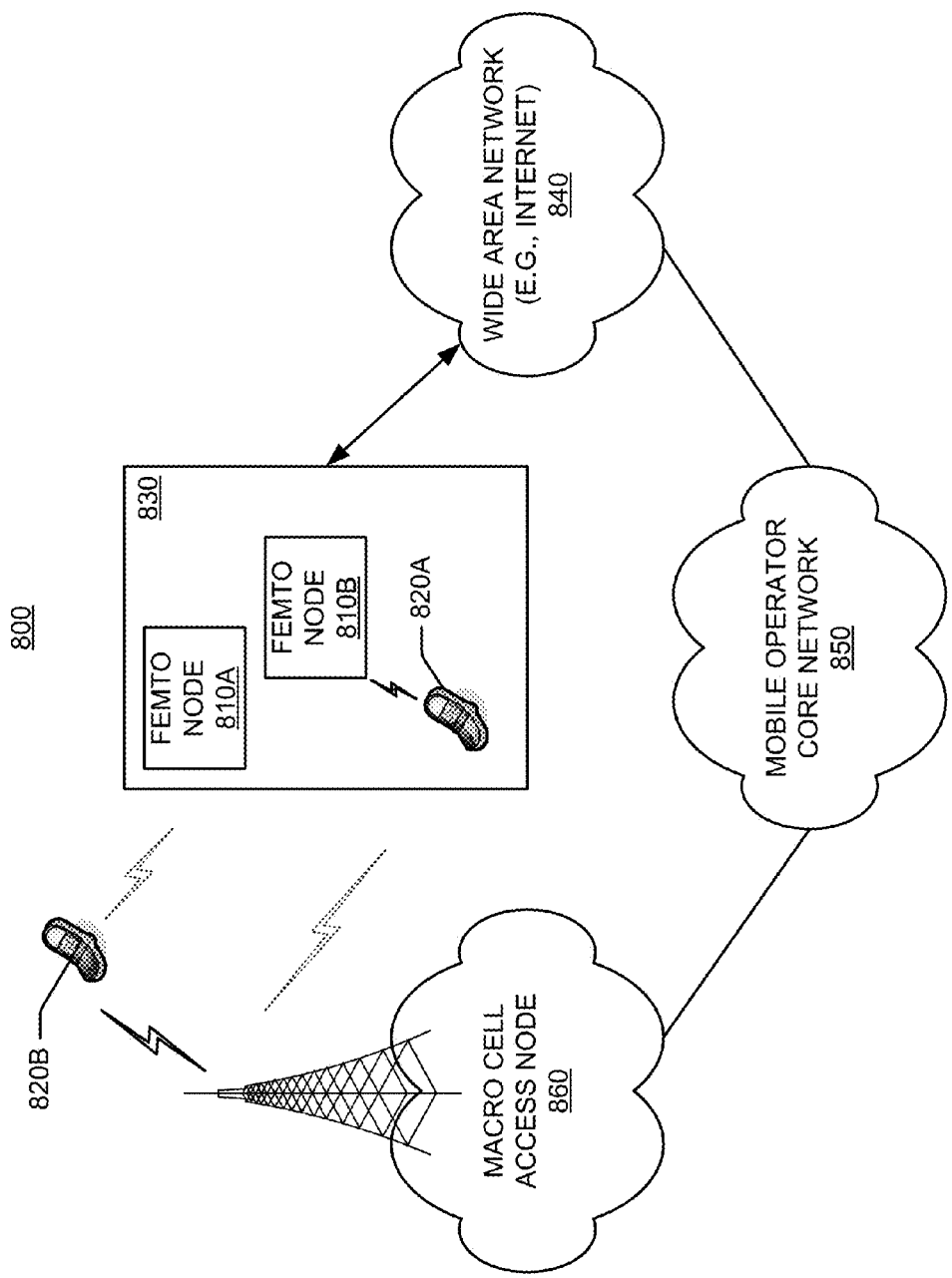
FIG. 8 is a simplified diagram of a wireless communication system including femto nodes.

Connectivity for a femto node environment may be established in various ways. For example, FIG. 8 illustrates a communication system 800 where one or more femto nodes are deployed within a network environment. Specifically, the system 800 includes multiple femto nodes 810 (e.g., femto nodes 810A and 810B) installed in a relatively small scale network environment (e.g., in one or more user residences 830). Each femto node 810 may be coupled to a wide area network 840 (e.g., the Internet) and a mobile operator core network 850 via a DSL router, a cable modem, a wireless link, or other connectivity means (not shown). As discussed herein, each femto node 810 may be configured to serve associated access terminals 820 (e.g., access terminal 820A) and, optionally, other access terminals 820 (e.g., access terminal 820B). In other words, access to femto nodes 810 may be restricted whereby a given access terminal 820 may be served by a set of designated (e.g., home) femto node(s) 810 but may not be served by any non-designated femto nodes 810 (e.g., a neighbor's femto node 810).

The owner of a femto node 810 may subscribe to mobile service, such as, for example, 3G mobile service offered through the mobile operator core network 850. In addition, an access terminal 820 may be capable of operating both in macro environments and in smaller scale (e.g., residential) network environments. In other words, depending on the current location of the access terminal 820, the access terminal 820 may be served by an access node 860 of the macro cell mobile network 850 or by any one of a set of femto nodes 810 (e.g., the femto nodes 810A and 810B that reside within a corresponding user residence 830). For example, when a subscriber is outside his home, he is served by a standard macro access node (e.g., the node 860) and when the subscriber is at home, he/she is served by a femto node (e.g., the node 810B). Here, it should be appreciated that a femto node 810 may be backward compatible with existing access terminals 820.

A femto node 810 may be deployed on a single frequency or, in the alternative, on multiple frequencies. Depending on the particular configuration, the single frequency or one or more of the multiple frequencies may overlap with one or more frequencies used by a macro node (e.g., the node 860).

In some aspects, an access terminal 820 may be configured to communicate either with the macro network 850 or the femto nodes 810, but not both simultaneously. In addition, in some aspects an access terminal 820 being served by a femto node 810 may not be in a soft handover state with the macro network 850.

In some aspects, an access terminal 820 may be configured to connect to a preferred femto node (e.g., the home femto node of the access terminal 820) whenever such connectivity is possible. For example, whenever a subscriber's access terminal 820 is within the subscriber's residence 830, it may be desired that the access terminal 820 communicate only with a home femto node 810.

In some aspects, if the access terminal 820 operates within the macro cellular network 850 but is not residing on its most preferred network (e.g., as defined in a preferred roaming list), the access terminal 820 may continue to search for the most preferred network (e.g., the preferred femto node 810) using a Better System Reselection ("BSR"), which may involve a periodic scanning of available systems to determine whether better systems are currently available, and subsequent efforts to associate with such preferred systems. With the acquisition entry, the access terminal 820 may limit the search for specific band and channel. For example, the search for the most preferred system may be repeated periodically. Upon discovery of a preferred femto node 810, the access terminal 820 selects the femto node 810 for camping within its coverage area.

As mentioned above, an access node such as a femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 810 that reside within the corresponding user residence 830). In some implementations, a node may be restricted to not provide at least one of: signaling, data access, registration, paging, or service to at least one node.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 9:
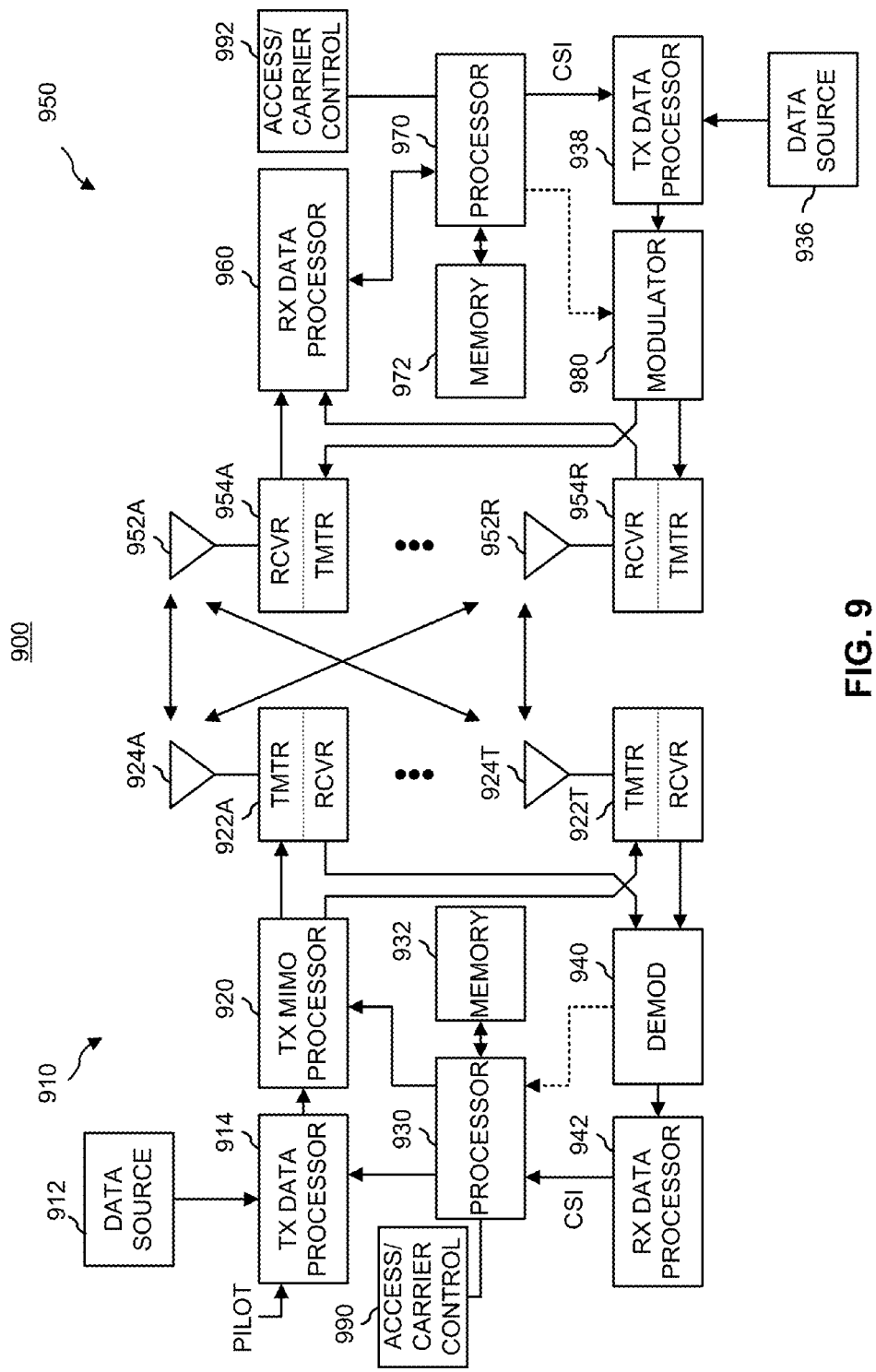
FIG. 9 is a simplified block diagram of several sample aspects of communication components.
Figure 10:
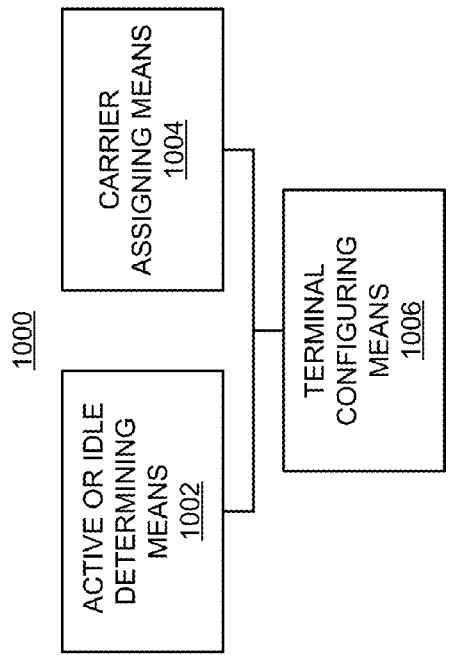
Figure 11:
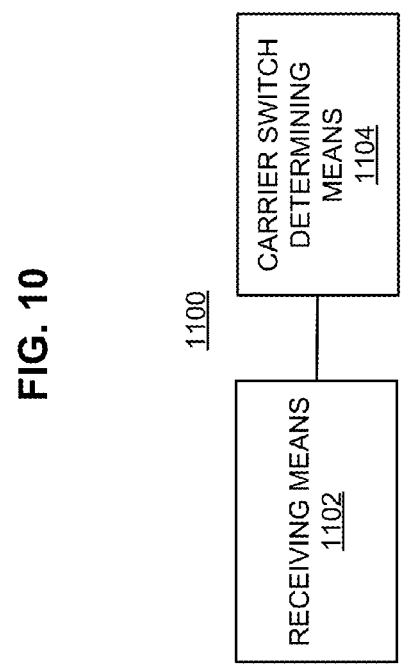
Figure 12:
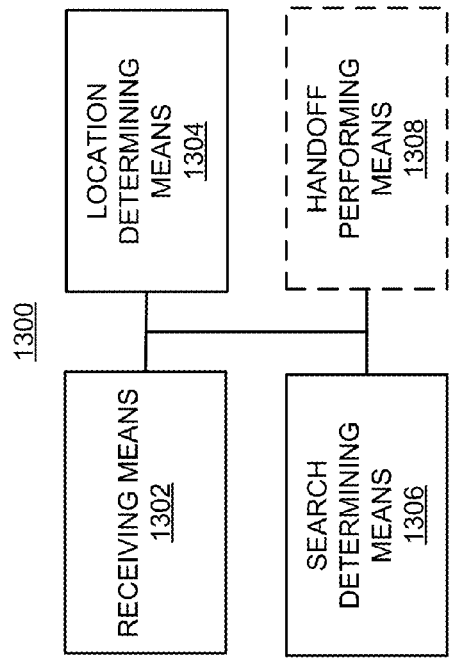
Figure 13:
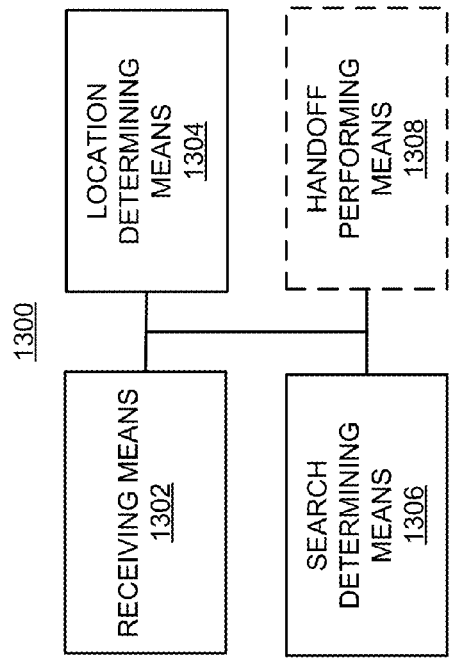

The teachings herein may be incorporated into a node (e.g., a device) employing various components for communicating with at least one other node. FIG. 9 depicts several sample components that may be employed to facilitate communication between nodes. Specifically, FIG. 9 illustrates a wireless device 910 (e.g., an access point) and a wireless device 950 (e.g., an access terminal) of a MIMO system 900. At the device 910, traffic data for a number of data streams is provided from a data source 912 to a transmit ("TX") data processor 914.

In some aspects, each data stream is transmitted over a respective transmit antenna. The TX data processor 914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a TX MIMO processor 920, which may further process the modulation symbols (e.g., for OFDM). The TX MIMO processor 920 then provides $N_T$ modulation symbol streams to $N_T$ transceivers ("XCVR") 922A through 922T. In some aspects, the TX MIMO processor 920 applies beam-forming weights to the symbols of the data streams and to the antenna from which the symbol is being transmitted.

Each transceiver 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 922A through 922T are then transmitted from $N_T$ antennas 924A through 924T, respectively.

At the device 950, the transmitted modulated signals are received by $N_R$ antennas 952A through 952R and the received signal from each antenna 952 is provided to a respective transceiver ("XCVR") 954A through 954R. Each transceiver 954 conditions (e.g., filters, amplifies, and down-converts) a respective received signal, digitizes the conditioned signal to provide samples, and further processes the samples to provide a corresponding "received" symbol stream.

A receive ("RX") data processor 960 then receives and processes the $N_R$ received symbol streams from $N_R$ transceivers 954 based on a particular receiver processing technique to provide $N_T$ "detected" symbol streams. The RX data processor 960 then demodulates, deinterleaves, and decodes each detected symbol stream to recover the traffic data for the data stream. The processing by the RX data processor 960 is complementary to that performed by the TX MIMO processor 920 and the TX data processor 914 at the device 910.

A processor 970 periodically determines which pre-coding matrix to use (discussed below). The processor 970 formulates a reverse link message comprising a matrix index portion and a rank value portion. A data memory 972 may store program code, data, and other information used by the processor 970 or other components of the device 950.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by the transceivers 954A through 954R, and transmitted back to the device 910.

At the device 910, the modulated signals from the device 950 are received by the antennas 924, conditioned by the transceivers 922, demodulated by a demodulator ("DEMOD") 940, and processed by a RX data processor 942 to extract the reverse link message transmitted by the device 950. The processor 930 then determines which pre-coding matrix to use for determining the beam-forming weights then processes the extracted message.

FIG. 9 also illustrates that the communication components may include one or more components that perform access/carrier control operations as taught herein. For example, an access/carrier control component 990 may cooperate with the processor 930 and/or other components of the device 910 to send/receive signals to/from another device (e.g., device 950) as taught herein. Similarly, an access/carrier control component 992 may cooperate with the processor 970 and/or other components of the device 950 to send/receive signals to/from another device (e.g., device 910). It should be appreciated that for each device 910 and 950 the functionality of two or more of the described components may be provided by a single component. For example, a single processing component may provide the functionality of the access/carrier control component 990 and the processor 930 and a single processing component may provide the functionality of the access/carrier control component 992 and the processor 970.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (IxRTT, 1×EV-DO RelO, RevA, RevB) technology and other technologies.

The teachings herein may be incorporated into (e.g., implemented within or performed by) a variety of apparatuses (e.g., wireless nodes). For example, an access node as discussed herein (e.g., a macro node, a femto node, or a pico node) may be configured or referred to as an access point ("AP"), a base station ("BS"), a NodeB, a radio network controller ("RNC"), an eNodeB, a base station controller ("BSC"), a base transceiver station ("BTS"), a transceiver function ("TF"), a radio router, a radio transceiver, a basic service set ("BSS"), an extended service set ("ESS"), a radio base station ("RBS"), or some other terminology.

In addition, an access terminal as discussed herein may be referred to as a mobile station, user equipment, a subscriber unit, a subscriber station, a remote station, a remote terminal, a user terminal, a user agent, a user device, or some other terminology. In some implementations such a node may consist of, be implemented within, or include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem.

Accordingly, one or more aspects taught herein may consist of, be implemented within, or include variety types of apparatuses. Such an apparatus may comprise a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access node (e.g., an access point) for a communication system. Such an access node may provide, for example, connectivity for or to a network (e.g., a wide area network such as the Internet or a cellular network) via a wired or wireless communication link. Accordingly, the access node may enable another node (e.g., an access terminal) to access the network or some other functionality. In addition, it should be appreciated that one or both of the nodes may be portable or, in some cases, relatively non-portable. Also, it should be appreciated that a wireless node (e.g., a wireless device) also may be capable of transmitting and/or receiving information in a non-wireless manner via an appropriate communication interface (e.g., via a wired connection).

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components (e.g., transmitter 208 or 212 and receiver 210 or 214) that may include various components (e.g., signal generators and signal processors) that facilitate communication over a wireless medium.

The components described herein may be implemented in a variety of ways. Referring to FIGS. 10-16, apparatuses 1000, 1100, 1200, 1300, 1400, 1500, and 1600 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 10-16 relate to optional functionality.

The apparatuses 1000, 1100, 1200, 1300, 1400, 1500, and 1600 may include one or more modules that may perform one or more of the functions described above with regard to various figures. For example, an active or idle determining means 1002 may correspond to, for example, a mode determiner 226 as discussed herein. A carrier assigning means 1004 may correspond to, for example, a carrier selector 224 as discussed herein. A terminal configuring means 1006 may correspond to, for example, a carrier selector 224 as discussed herein. A receiving means 1102 may correspond to, for example, a receiver 210 as discussed herein. A carrier switch determining means 1104 may correspond to, for example, a carrier selector 222 as discussed herein. A receiving means 1202 may correspond to, for example, a receiver as discussed herein. A carrier switch determining means 1204 may correspond to, for example, a carrier selector 224 as discussed herein. A receiving means 1302 may correspond to, for example, a receiver 210 as discussed herein. A location determining means 1304 may correspond to, for example, a location determiner 228 as discussed herein. A search determining means 1306 may correspond to, for example, a search controller 230 as discussed herein. A handoff performing means 1308 may correspond to, for example, a handoff controller 232 as discussed herein. A receiving means 1402 may correspond to, for example, a receiver 214 as discussed herein. An access determining means 1404 may correspond to, for example, an access controller 216 as discussed herein. A receiving means 1502 may correspond to, for example, a receiver as discussed herein. An access determining means 1504 may correspond to, for example, an access controller 218 as discussed herein. A transmitting means 1506 may correspond to, for example, a transmitter as discussed herein. A terminal identifying means 1602 may correspond to, for example, a receiver 214 as discussed herein. An authenticating means 1604 may correspond to, for example, an authorization controller 234 as discussed herein. A parameter presenting means 1606 may correspond to, for example, a transmitter 212 as discussed herein. A receiving means 1608 may correspond to, for example, a receiver 214 as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
receiving at an access terminal a first set of signals from a first access node on a first carrier, wherein the access terminal is associated with the first access node;
determining a carrier-to-interference associated with the first access node based on the first set of signals;
receiving at the access terminal a second set of signals from a second access node on the first carrier;
determining whether the second access node is a preferred access node for the access terminal based on the second set of signals and a preferred roaming list; and
performing a carrier switch to receive signals from the first access node on a second carrier when the carrier-to-interference is less than or equal to a threshold and when the second access node is not a preferred access node for the access terminal.

2. The method of claim 1, wherein the carrier switch comprises an active handoff if an access terminal that performs the carrier switch is in active communication with the first access node.

3. The method of claim 1, wherein the carrier switch comprises scanning for the signals on the second carrier if an access terminal that performs the carrier switch is idling on the first access node.

4. The method of claim 1, wherein the second access node is restricted to not provide at least one of the group consisting of: signaling, data access, registration, paging, and service to at least one node.

5. The method of claim 1, wherein the second access node comprises a femto node or a pico node.

6. An apparatus for wireless communication, comprising:
a receiver configured to:
receive at an access terminal a first set of signals from a first access node on a first carrier, wherein the access terminal is associated with the first access node, and
receive at the access terminal a second set of signals from a second access node on the first carrier; and
a carrier selector configured to:
determine a carrier-to-interference associated with the first access node based on the first set of signals,
determine whether the second access node is a preferred access node for the access terminal based on the second set of signals and a preferred roaming list, and
perform a carrier switch to receive signals from the first access node on a second carrier when the carrier-to-interference is less than or equal to a threshold and when the second access node is not a preferred access node for the access terminal.

7. The apparatus of claim 6, wherein the second access node is restricted to not provide at least one of the group consisting of: signaling, data access, registration, paging, and service to at least one node.

8. An apparatus for wireless communication, comprising:
means for receiving at an access terminal a first set of signals from a first access node on a first carrier, wherein the access terminal is associated with the first access node;
means for determining a carrier-to-interference associated with the first access node based on the first set of signals;
means for receiving at the access terminal a second set of signals from a second access node on the first carrier;
means for determining whether the second access node is a preferred access node for the access terminal based on the second set of signals and a preferred roaming list; and
means for performing a carrier switch to receive signals from the first access node on a second carrier when the carrier-to-interference is less than or equal to a threshold and when the second access node is not a preferred access node for the access terminal.

9. The apparatus of claim 8, wherein the second access node is restricted to not provide at least one of the group consisting of: signaling, data access, registration, paging, and service to at least one node.

10. A non-transitory computer-readable medium comprising codes for causing a computer to:
- receive at an access terminal a first set of signals from a first access node on a first carrier, wherein the access terminal is associated with the first access node;
- determine a carrier-to-interference associated with the first access node based on the first set of signals;
- receive at the access terminal a second set of signals from a second access node on the first carrier;
- determine whether the second access node is a preferred access node for the access terminal based on the second set of signals and a preferred roaming list; and
- perform a carrier switch to receive signals from the first access node on a second carrier when the carrier-to-interference is less than or equal to a threshold and when the second access node is not a preferred access node for the access terminal.

11. The non-transitory computer-readable medium of claim 10, wherein the second access node is restricted to not provide at least one of the group consisting of: signaling, data access, registration, paging, and service to at least one node.

* * * * *